US006634383B2

(12) United States Patent
Aarestad

(10) Patent No.: US 6,634,383 B2

(45) Date of Patent: Oct. 21, 2003

(54) MAGNETIC DETENT ASSIST ASSEMBLY

(75) Inventor: Robert A. Aarestad, Washington, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 10/020,039

(22) Filed: Dec. 14, 2001

(65) Prior Publication Data

US 2003/0111120 A1 Jun. 19, 2003

(51) Int. Cl.[7] ......................... F16K 11/14; F16K 31/08; F16K 31/60

(52) U.S. Cl. ........................ 137/636.1; 74/527; 74/528; 74/531; 74/471 R; 74/471 XY; 251/65; 251/97

(58) Field of Search ........................... 137/636.1, 636.2, 137/596, 596.1, 625.6, 625.68, 636; 91/465; 74/527, 529, 471 XY, 523, 528, 531; 251/65, 297

(56) References Cited

U.S. PATENT DOCUMENTS

| | | | | |
|---|---|---|---|---|
| 1,777,580 A | * | 10/1930 | Russell | 251/297 |
| 2,630,832 A | | 3/1953 | Lutherer | |
| 2,958,233 A | | 11/1960 | Johnson | |
| 3,429,550 A | * | 2/1969 | Grove | 251/297 |
| 4,132,128 A | | 1/1979 | Roggenkamp | |
| 4,342,335 A | | 8/1982 | Reinicker et al. | |
| 4,427,176 A | | 1/1984 | Livet | |
| 4,530,376 A | | 7/1985 | Chatterjea | |
| 4,777,981 A | * | 10/1988 | Petro | 137/636.2 |
| 4,827,982 A | | 5/1989 | Imagaki | |
| 4,922,784 A | | 5/1990 | Hidaka et al. | |
| 4,938,120 A | | 7/1990 | Hafele et al. | |
| 5,058,451 A | | 10/1991 | Fujimoto et al. | |
| 5,156,065 A | | 10/1992 | Fujimoto et al. | |
| 5,176,041 A | | 1/1993 | Meier et al. | |
| 5,235,869 A | | 8/1993 | Nyezdatny | |
| 5,566,710 A | | 10/1996 | Dahlgren et al. | |
| 5,638,866 A | | 6/1997 | Mueller | |
| 5,743,297 A | * | 4/1998 | Mueller | 137/636.2 |
| 6,098,481 A | | 8/2000 | Mills et al. | |

* cited by examiner

*Primary Examiner*—George L. Walton

(74) *Attorney, Agent, or Firm*—Diana L. Charlton; Jeff A Greene

(57) ABSTRACT

The present invention is a control arrangement that includes a detent assist assembly for assisting a detent arrangement in holding a control device in a predetermined position. Additionally, the detent assist assembly serves as an actuator for a control valve operative with the control device. Further, the detent assist assembly provides tactile feedback to an operator through the control device. The present invention is a simple and efficient device for providing a detent assist with tactile feedback.

11 Claims, 8 Drawing Sheets

MAGNETIC DETENT ASSIST ASSEMBLY

TECHNICAL FIELD

This invention relates generally to a magnetic detent arrangement and more particularly to an improved mechanism for assisting the magnetic detent arrangement and for providing tactile feedback to an operator.

BACKGROUND

In many hydraulic and pneumatic systems, control valves are provided for regulating the flow of fluid from a pressurized source to one or more control devices. Control devices are commonly used on machines to provide an input by an operator to perform desired functions on a work machine. Typically, the control devices are movable to a plurality of positions. The control devices are normally spring biased to return to a neutral position when the operator releases the control device. In many work machines, it is well known to provide a detent arrangement to hold the control device in a single position to reduce operator fatigue. There are many common types of detent arrangements that may be utilized for this purpose, including mechanical, magnetic, electromagnet and the like. Many of these detents have proven that they are not sufficient to hold the control device at the desired detented position when the machine is being subjected to rough terrain or the operator inadvertently touches the control device. Therefore, it is desirable to provide either a high force detent arrangement or a mechanism for assisting the detent arrangement that will more effectively hold the control device in the desired detented position. Likewise, it is desirable to provide a tactile feedback to the operator before the detent arrangement is engaged. Upon sensing the tactile feedback, the operator is able to avoid further movement of the control device and the resulting actuation of the detent arrangement. Also, in this manner, the operator will be aware of the location and "feel" of the control device and the resulting function achieved on the work machine.

U.S. Pat. No. 6,098,481 issued on Aug. 8, 2000 to Rudy V. Mills, et al. discloses a high force detent mechanism that selectively holds a control input lever in any selected position between neutral and its maximum travel in either direction. The high force detent mechanism includes a coil assembly connected to a control input lever and disposed in close proximity to a semi-circular member having a serrated edge defined thereon. An armature of the coil assembly has as first portion in driving contact with the serrated edge and a second enlarged portion having a latching surface disposed adjacent one of the first and second end faces of the coil assembly's detent coil. The size of the latching surface is larger than the size of the first portion that is in driving contact with the serrated edge. Consequently, the latching force generated between the latching surface and the one face of the detent coil is multiplied several times to create a detent holding force that is larger than the latching force. In this design, the detent holding force is created to increase the effective latching capability of the detent. Accordingly, an operator utilizing the detent mechanism would have to overcome the increased detent holding force in order to move the control lever to the neutral position. Due to the increased detent holding force, this effort may be fatiguing to the operator over extended periods of time. Also, the increased high force detent mechanism does not increase tactile feedback to the operator during movement of the control lever which is useful for assessing when a function of the work machine is changing.

U.S. Pat. No. 5,566,710 issued on Oct. 22, 1996 to Derek A. Dahlgren, et al. discloses an improved pre-detent tactile feedback assembly for a fluid control valve. The pre-detent tactile feedback assembly includes an elastic member, such as a garter type spring, seated within an annular groove formed in the bore of a plunger valve assembly. When the plunger is moved from an opened to a closed position, a portion of the plunger contacts the elastic member, urging the elastic member outwardly into the groove. The additional force required to urge the elastic member into the groove provides a "feel" force to the control lever. Preferably, the groove is positioned within the bore so that this feel" force is sensed just prior to actuation of an associated detent assembly. In this design, the improved structure effectively increases the force required to move the control lever just prior to engagement of the detent but does not increase the force acting against the detent to assist in holding the detent in a desired detented position.

The present invention is directed to overcoming one or more of the problems as set forth above.

SUMMARY OF THE INVENTION

In one aspect of the present invention, a detent assist assembly for a detent arrangement comprises a first member with an outer surface that includes a resistance portion. A second member is movable from a neutral position to first and second positions wherein movement to the first position engages the second member with the resistance portion and movement to the second position disengages the second member from the resistance portion. The second member is operative with the resistance portion when in the second position to assist in holding the detent arrangement in a predetermined position.

In another aspect of the present invention, a control arrangement is disclosed for actuating at least two control valves. The control arrangement comprises a control device that is movable from a neutral position to first and second control positions. The control device has an actuator for actuating one of the control valves when moved to the first control position. A detent arrangement is operative with the control device for holding the control device in the first control position. A detent assist assembly is operative with the control device with means for assisting the detent arrangement in holding the control device in the first control position. The detent assist assembly has an actuator for actuating the other one of the control valves when the control device is moved to the second control position.

The present invention is a control arrangement that includes a detent assist assembly for assisting a detent arrangement in holding a control device in a predetermined position. Additionally, the detent assist assembly serves as an actuator for a control valve operative with the control device. Further, the detent assist assembly provides tactile feedback to an operator through the control device. The present invention is a simple and efficient device for providing the improved features herein.

DETAILED DESCRIPTION

Figure 1:
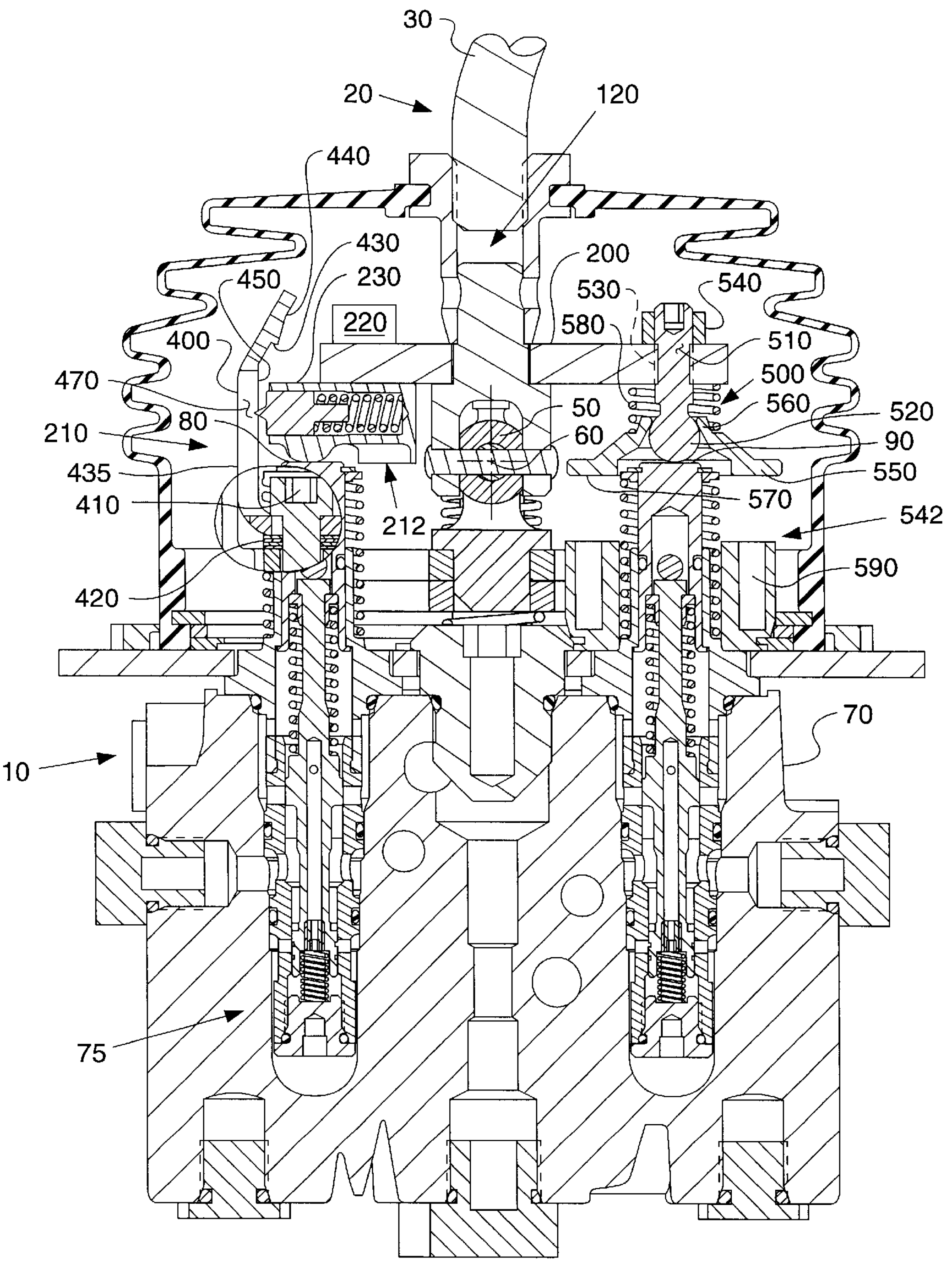
FIG. 1 is a sectional view and diagrammatic representation of a control arrangement incorporating the present invention.

While the invention is open to various modification and alternative forms, a specific embodiment thereof has been shown by way of example in the drawings and will herein be described in detail. However, there is no intent to limit the invention to the particular form disclosed.

Figure 2:
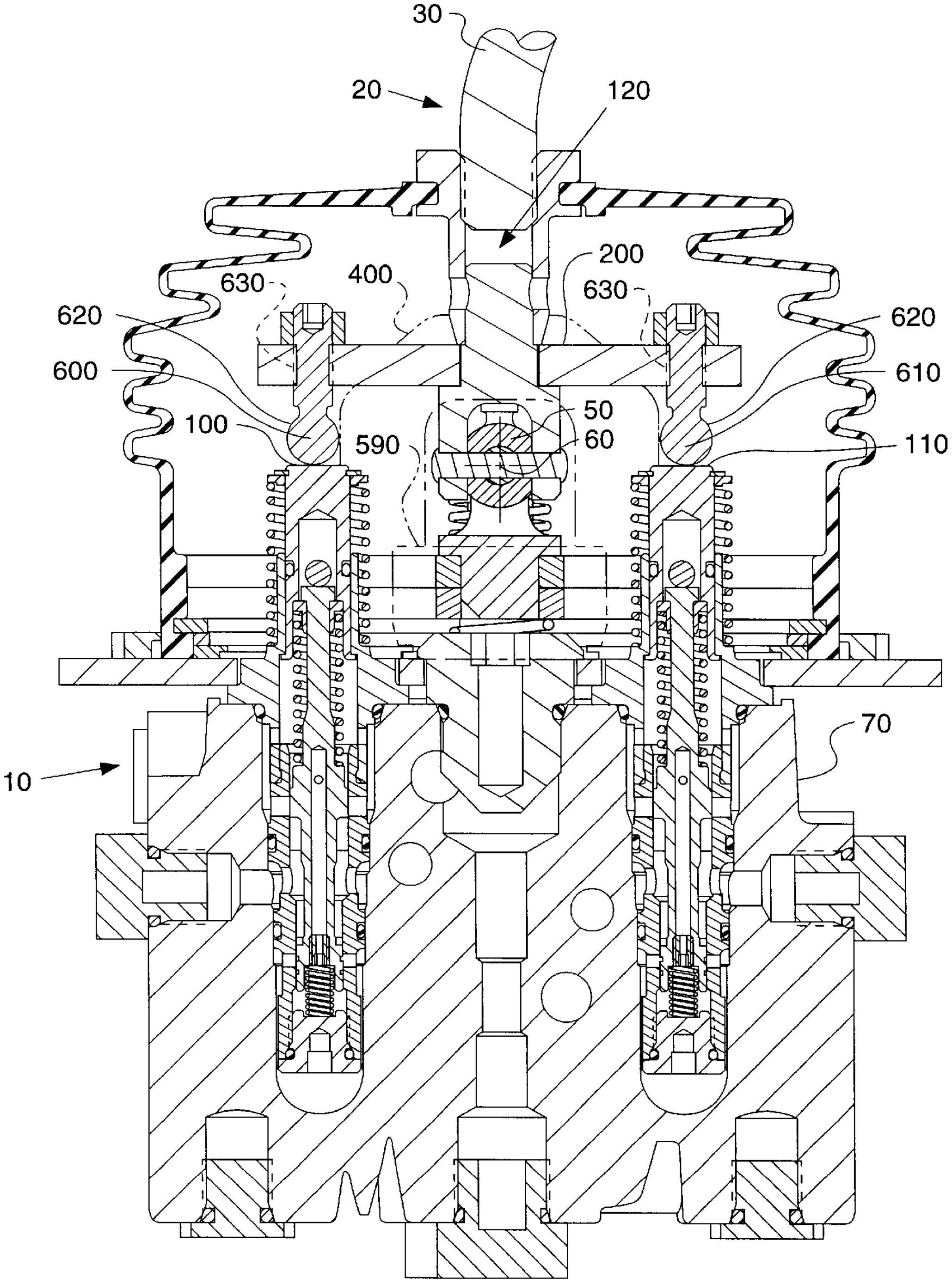
FIG. 2 is a sectional view and diagrammatic representation of the control arrangement taken ninety degrees from the view shown in FIG. 1.
Figure 3:
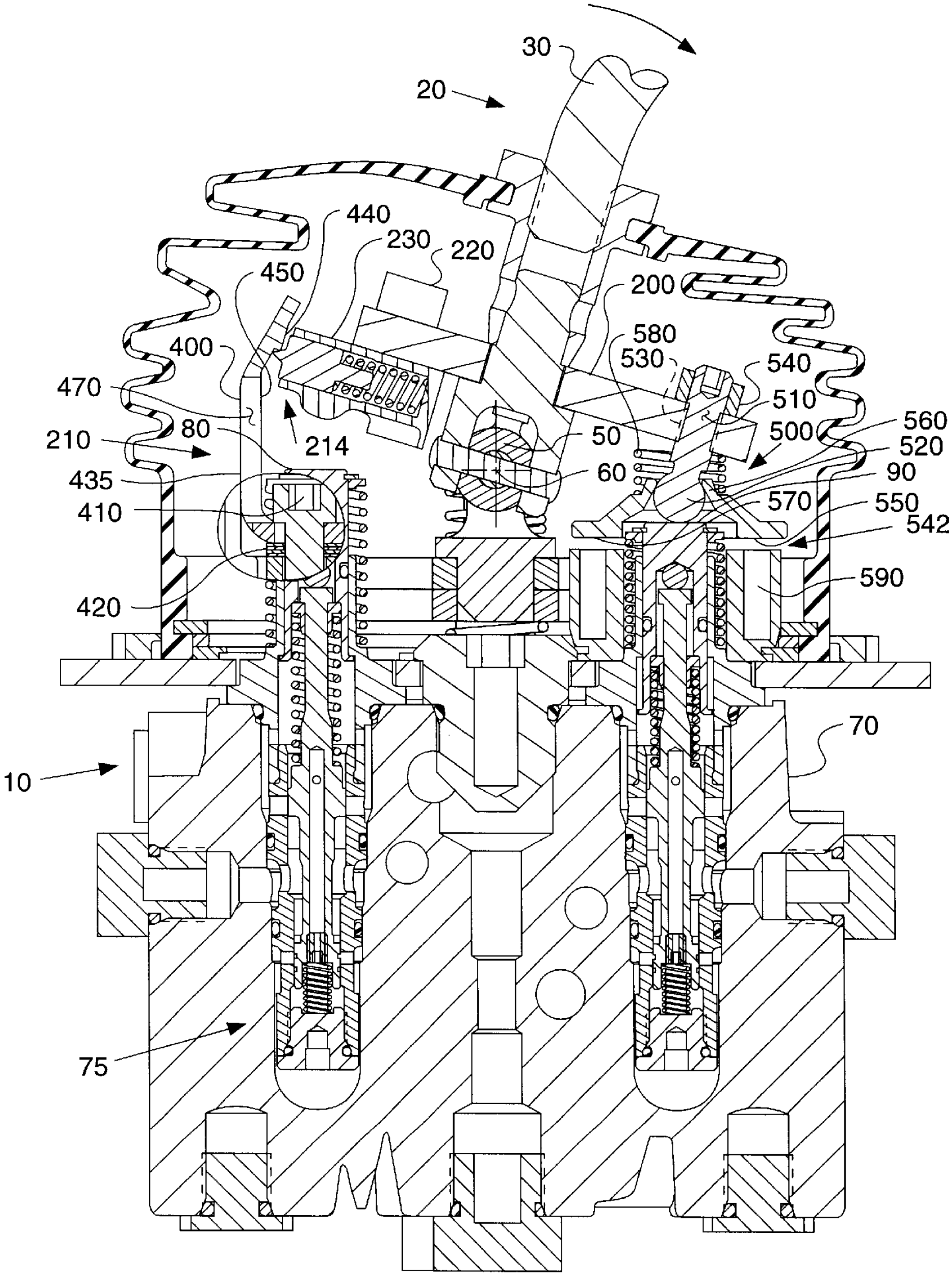
FIG. 3 is a sectional view and diagrammatic representation of the control arrangement shown in a first rotated position in a first direction.
Figure 4:
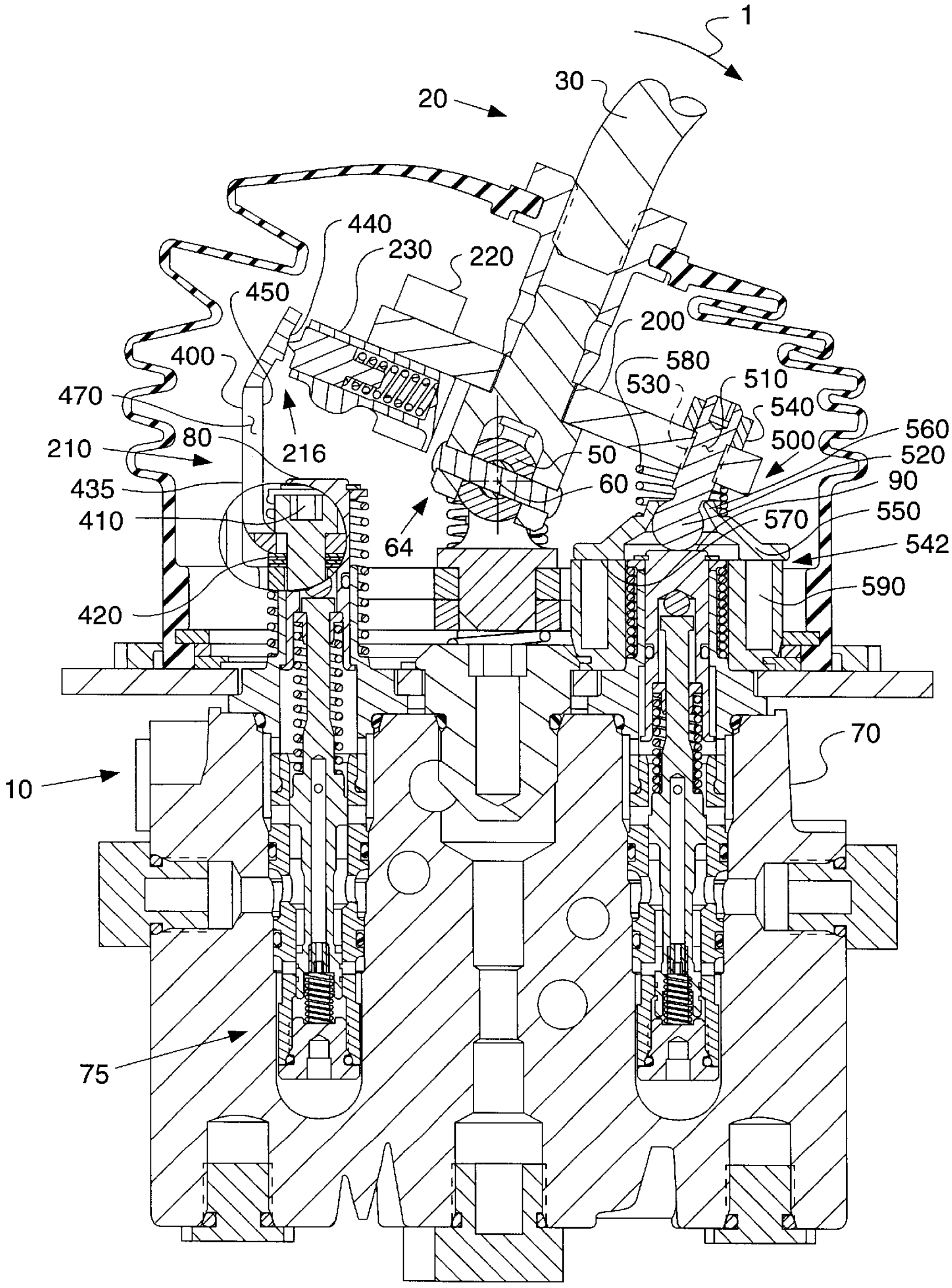
FIG. 4 is a sectional view and diagrammatic representation of the control arrangement shown in a second rotated position in the first direction.
Figure 5:
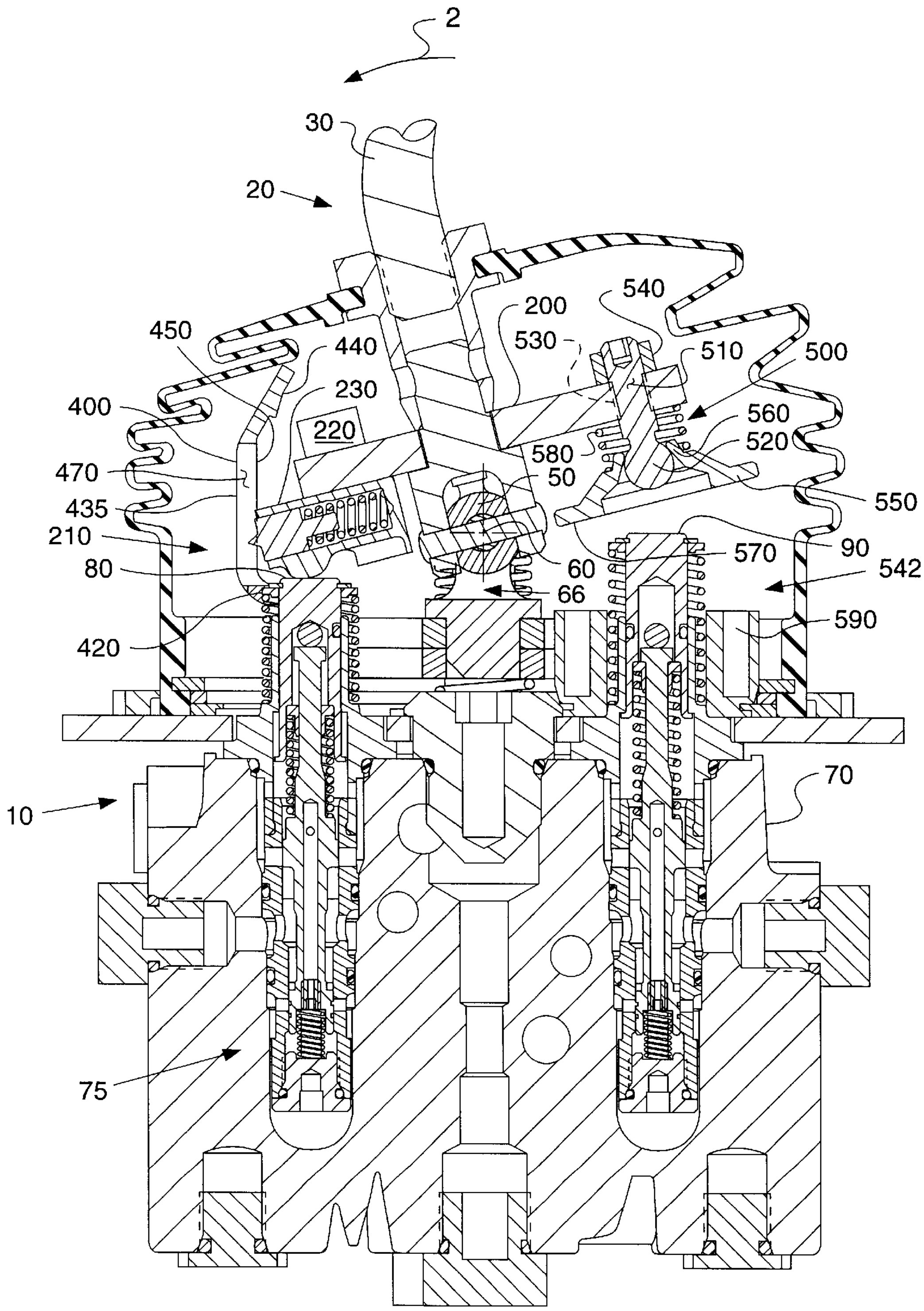
FIG. 5 is a sectional view and diagrammatic representation of the control arrangement shown in a rotated position in a second direction.

Referring to the drawings, a control arrangement 10 is shown in FIGS. 1–5 and includes a control lever assembly 20. In particular, the control arrangement 10 is used for controlling various work machine implement functions, such as, blade float, blade quick drop, dozer raise, and the like. However, it should be understood that the control arrangement 10 may be used for any suitable application, such as, controlling other work machine functions, recreational vehicles (not shown), video games (not shown) or other suitable devices. The control lever assembly 20 is seen best in FIG. 6 and includes a control device or joystick portion 30 that is connected to a support 40 through a universal coupling 50 for pivotal movement about a pivot 60. A first control position 64 of the joystick portion 30 is achieved as the joystick portion 30 is pivoted in the direction of arrow 1 shown in FIG. 4. A second control position 66 of the joystick is achieved as the joystick portion 30 is pivoted in the direction of arrow 2 shown in FIG. 5. A plurality of additional control positions (not shown) other than the first and second control positions are achieved via the pivotal movement of the joystick portion 30 about the pivot 60. The support 40 can be, for example, a component of a pilot valve body 70 or a separate plate in connection with the pilot valve body 70. The pilot valve body 70 includes a plurality of control valve assemblies, one of which is shown at 75, disposed therein. The control valve assemblies 75 each have plungers, two of which are shown at 80,90 in FIG. 1, that are operative with the joystick portion 30. The plungers 80,90 extend through the support 40 on opposite sides of the universal coupling 50. Another two plungers, shown at 100,110 in FIG. 2, are typically located at ninety degrees from the plungers 80,90. The plungers 80,90,100,110 are spring biased for centering the joystick portion 30 to a neutral position 120 in a well-known manner, as shown in FIGS. 1–2.

Figure 6:
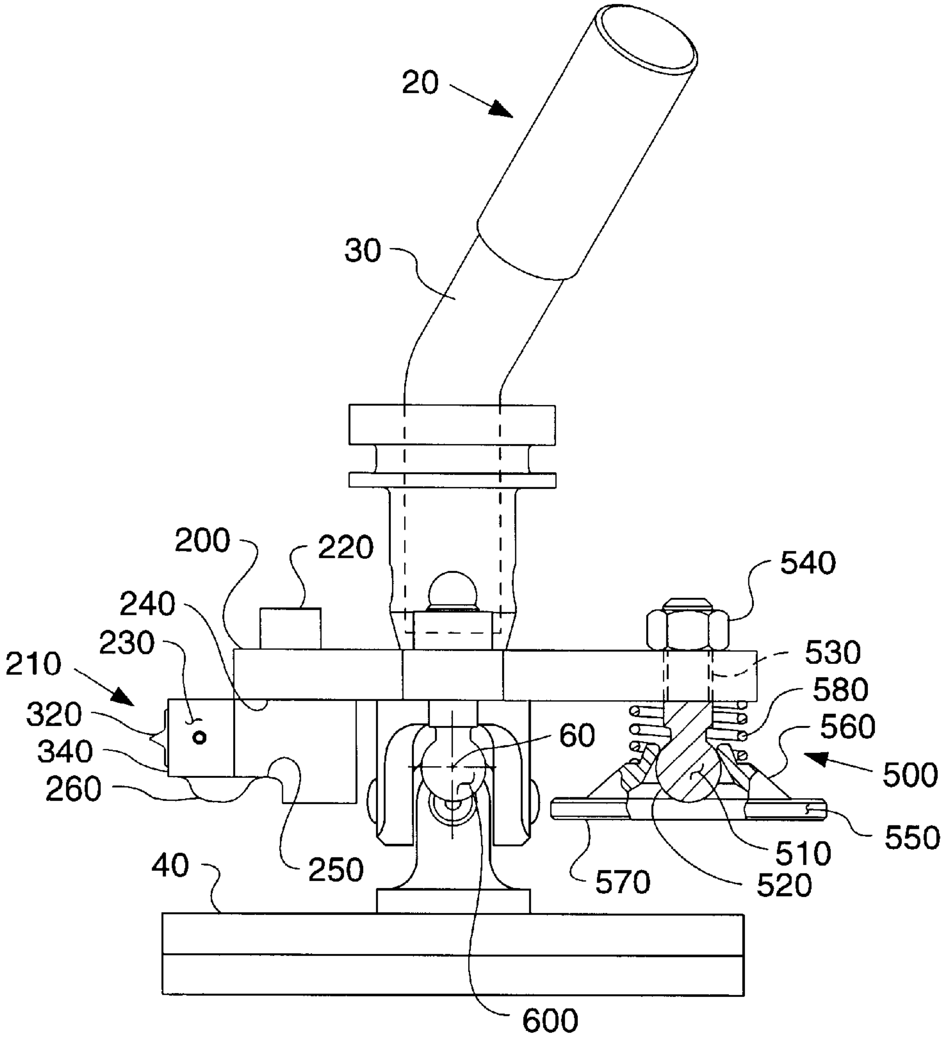
FIG. 6 is a side view of a diagrammatic representation of a control lever assembly incorporated in the control arrangement of FIG. 1.
Figure 7:
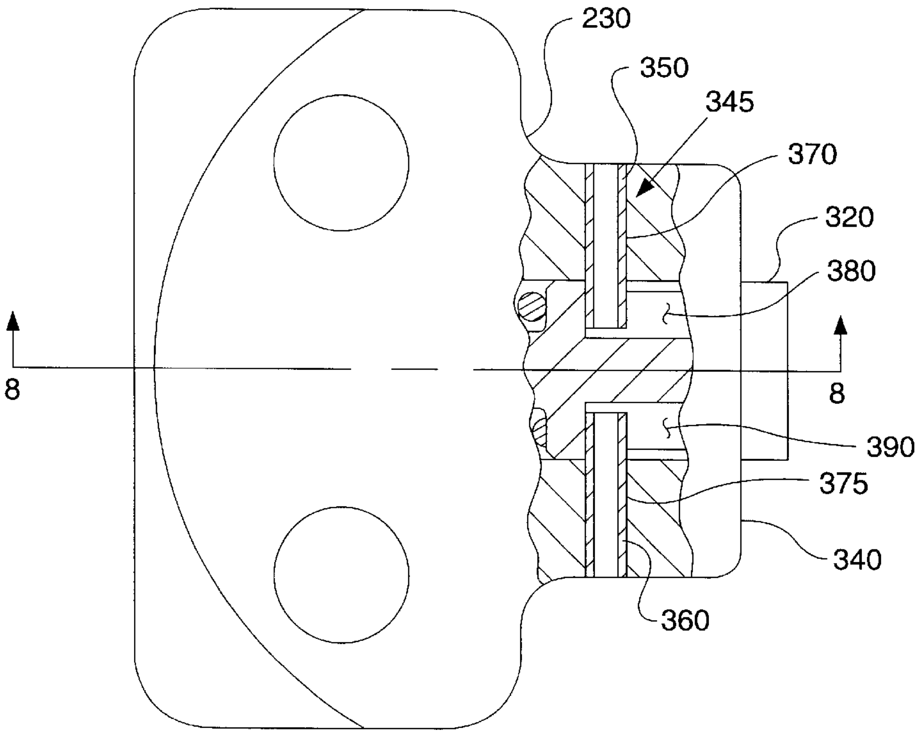
FIGS. 7–10 are detailed views of first and second members of a detent assembly incorporated in the control arrangement of FIG. 1.
Figure 8:
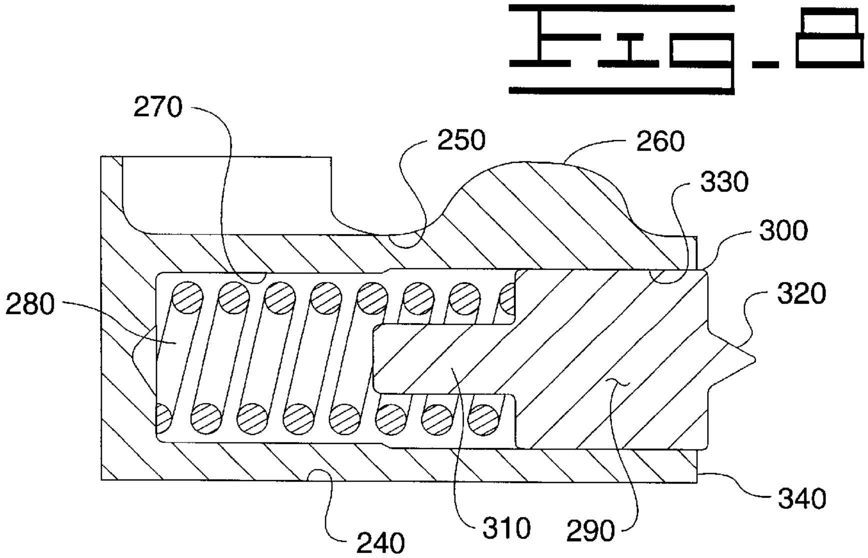

Referring with particularity to FIG. 6, a carrier 200 is mounted with the joystick portion 30 and spaced a predetermined distance from the support 40. A detent assist assembly 210 is mounted on the carrier 200 in any suitable manner, such as through bolts, one of which is shown at 220. The detent assist assembly 210 is operative with the joystick portion 30 for movement from a neutral position 212, shown in FIG. 1, to first and second operating positions 214,216 shown in FIGS. 3–4, respectively. Referring to FIGS. 7–8, the detent assist assembly 210 is shown in detail and includes a detent housing 230 having a first planar surface 240, a second surface 250 with a contact portion 260 opposite the planar surface 240 and a stepped bore 270 therethrough. A biasing spring 280 is positioned within the bore 270. A detent 290 is slidingly disposed within the bore 270 and includes head and rod end portions 300,310. The spring 280 encircles the rod end portion 310 for abutment against the head end portion 300 so that the detent 290 is capable of movement from a normally extended position to a plurality of positions within the bore 270 upon actuation of the spring 180. A knife edge 320 is formed on an outer surface 330 of the head end portion 300 and extends beyond a front face 340 of the detent housing 230 in the normally extended position. Means are used for connecting the detent 290 within the detent housing 230 and include a pair of spring pins 350,360 that extend through a pair of slots 370,375 in the detent housing 230 and into a respective oversized slot 380,390 in the head end portion 300 of the detent 290. The pins 350,360 are free to slide within the slots 380,390 within the range permitted. Although pins 350,360 are used in the preferred embodiment, it should be understood that any suitable connection means may be used such as bolts, rivets, and the like that are extendable from the detent housing 230 and into the slots 380,390.

Figure 9:
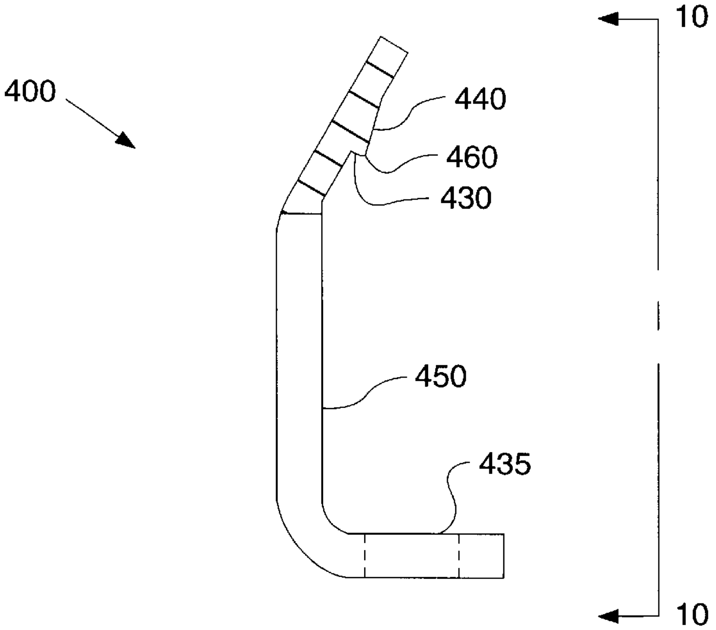
Figure 10:
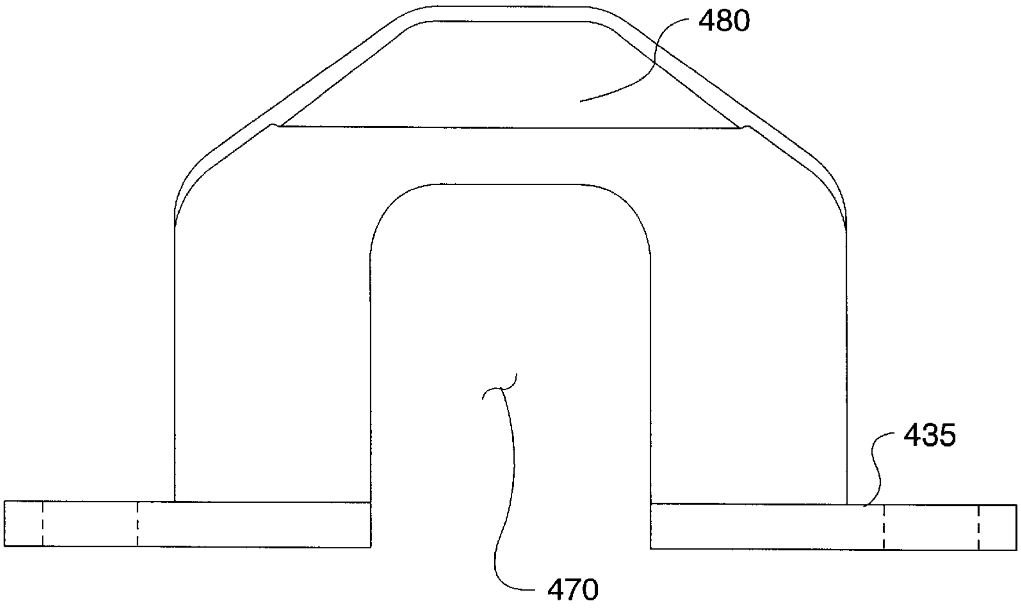

Referring specifically to FIGS. 1 & 3–5 and, for detail, to FIGS. 9–10, the detent assist assembly 210 further includes an action plate 400 connected with the pilot valve body 70 in any suitable manner, such as through bolts, one of which is shown at 410. One or more shims 420 may be used between the bolts 410 and the pilot valve body 70 in order to define a predetermined height for the action plate 400. The action plate 400 is formed in a substantial U-shape and includes a knife edge resistance portion 430. The knife edge resistance portion 430 is disposed between a lower portion 435 and a bent upper portion 440 and extends forwardly a predetermined length toward the detent housing 230 from an outer surface 450 to an outermost tip 460. The lower portion 435 of the action plate 400 includes a defined opening 470 therethrough to define the U-shape. A protrusion 480 is defined along the outer surface 450 of the action plate 400 between the knife edge resistance portion 430 and the upper portion 440.

Referring to FIGS. 1 & 3–5 and, for detail, to FIG. 6, a plunger pin assembly 500 is shown having a pin 510 with a contact end portion 520 and a threaded end portion 530 threaded through the carrier 200 on an opposite side of the universal coupling 50 from the detent assist assembly 210. The pin 510 is retained on the carrier 200 in any suitable manner, such as by nut 540.

A magnetic detent arrangement 542 is mounted on the plunger pin assembly 500 and includes a washer 550 that encompasses the contact end portion 520 of the pin 510 at a beveled, open end portion 560. The washer 550 is manufactured from any suitable magnetic material, such as steel, and has a planar surface 570 opposite the open end portion 560. A biasing spring 580 is positioned between the open end portion 560 and the carrier 200 to allow movement of the washer 550 upon actuation of the spring 580. The planar surface 570 of the washer 550 is spaced a predetermined distance from a magnet 590 when the joystick portion 30 is in the neutral position 120 shown in FIGS. 1–2. The magnet 590 is connected in any suitable manner with the pilot valve body 70 and surrounds a portion of the plunger 90.

Referring to FIG. 2, a pair of plunger pins 600,610 are located ninety degrees respectively from the detent assist assembly 210 and the plunger pin assembly 500. The plunger pins 600,610 each have a contact end portion 620 and a threaded end portion 630 threaded through the carrier 200 on opposite sides of the universal coupling 50. The contact end portions 520,620 of the plunger pins 600,610, 510, respectively, and the contact portion 260 of the housing 230 each are axially aligned with a respective plunger 80,90,100,110 in the pilot valve body 70. The plungers pins 510,600,610 and the contact portion 260 abut a top surface of the plungers 80,90,100,110. The plungers 80,90 are actuated in response to movement of the joystick portion 30 to a respective control position 64,66 about the pivot 60 and respondent action of the plunger pins 510 and the contact portion 260 of the housing 230. The plungers 100,110 are actuated in response to movement of the joystick portion 30 to a respective additional control position (not shown) about the pivot 60 and respondent action of the plunger pins 600,610.

INDUSTRIAL APPLICABILITY

When an operator (not shown) desires to maintain an implement (not shown) in a predetermined function, such as blade float, the joystick portion 30 is moved to a first control position 64. In this manner, the washer 550 of the magnetic detent arrangement 542 is held against the magnet 590 to engage the control lever assembly 20. The contact end 520 of the pin 510 actuates the respective control valve plunger 90 in a conventional manner to achieve the blade float implement function. In order to assist the magnetic detent arrangement 542 in holding the joystick portion 30 in the first control position 64, the detent assist assembly 210 moves cooperatively with the joystick portion 30 to the second operating position 216.

During movement of the detent assist assembly 210 to the second operating position 216, the first operating position 214 is reached when the knife edge 320 of the detent 290 contacts the knife edge resistance portion 430 of the action plate 400. When the knife edge 320 engages the knife edge resistance portion 430, a predetermined force is exerted on the spring 280. Extra force is required by the operator (not shown) to move the joystick portion 30 so that the detent assist assembly 210 moves along the knife edge resistance portion 430 to the outermost tip 460. During this movement, ever increasing forces are exerted on the spring 280 so that the detent 290 is moved inwardly into the detent housing 230.

As the knife edge 320 moves along a path between the knife edge resistance portion 430 and the second operating position 216, the knife edge 320 is in constant contact with the action plate 400 and the shape of the protrusion 480 is defined. Although the knife edge 320 remains in contact with the protrusion 480, the knife edge 320 becomes disengaged from the knife edge resistance portion 430 when the second operating position 216 is reached. As the forces on the spring 280 diminish accordingly, the detent 290 moves outwardly toward the upper portion 440 of the action plate 400. Thereafter, the shape of the protrusion 480 restricts the detent assist assembly 210 from moving from the second operating position 216 to the first operating position 214. It should be obvious that the shape of the protrusion 480 increases the force needed to move the detent assist assembly 210 from the second operating position 216 to the first operating position 214. This ability assists the magnetic detent assembly 542 in holding the joystick portion 30 in the first control position 64 during movement of the work machine (not shown) over rough terrain or during operation in heavy applications. Additionally, the likelihood of inadvertent movement of the joystick portion 30 by the operator (not shown) is decreased.

It should be understood that the joystick portion 30 may be moved to achieve various other functions of the work machine (not shown) when the implement (not shown) is in the blade float function. For instance, the joystick portion 30 may be moved about the pivot 60 to actuate control valves 100,110 to achieve a different predetermined function of the implement (not shown), such as right and left blade tilt. When this occurs, the detent 290 is able to rotate within the slots 380,390 to the extent provided while the knife edge 320 is held in a substantially continuous horizontal orientation relative to the ground (not shown). Therefore, the detent assist assembly 210 is held in the second operating position 216 and the blade float function of the implement (not shown) is maintained.

It should also be understood that the shims 420 are used to control the height of the action plate 400 and, in particular, the height of the knife edge resistance portion 430. In this manner, the contact of the detent assist assembly 210 with the action plate 400 is controlled to achieve the desired functional effects.

When the operator (not shown) desires to end the blade float implement function, the control lever assembly 20 must be disengaged from the magnet 590. To accomplish this, the operator (not shown) may move the joystick portion 30 or disengage the control lever assembly 20 in any other suitable manner, such as electrically or electronically. The joystick portion 30 is then urged to the neutral position 120 via the biasing spring action in the control valves assemblies 75. The movement of the joystick portion 30 provides enough force to overcome the restriction by the protrusion 480 to automatically move the detent assist assembly 210 to its neutral position 212.

When an operator (not shown) desires to operate the joystick portion 30 to achieve various other work machine implement functions in a nondetent mode, the joystick portion 30 may be moved to actuate the control valve plungers 80,100,110. It should be understood that the contact portion 260 of the detent housing 230 acts in a similar manner as the pins 510,600,610 to actuate the respective plunger 80 when the joystick portion 30 is moved to the second control position 66. Further, when moving the joystick portion 30 toward the first control position 64 so that the knife edge 320 engages with the knife edge resistance portion 430, tactile feedback is received by the operator (not shown) through resistance felt in the joystick portion 30. At that instant, the operator (not shown) will know that a particular predetermined function of the implement (not shown), such as blade quick drop, will occur within a preset time period. To prevent the blade quick drop implement function from occurring, the operator (not shown) may choose to return the joystick portion 30 to its neutral position 120 or may continue to move the joystick portion 30 to any one of the control positions prior to the preset time period. However, as is obvious, movement of the joystick portion 30 to the first control position 64 will actuate the control valve plunger 90 and engage the magnetic detent arrangement 542 to achieve the detent mode for the blade float implement function.

Other aspects, objects and advantages of the invention can be obtained from a study of the drawings, the disclosure and the appended claims.

What is claimed is:

1. A control arrangement for actuating at least two control valves, comprising:

a control device movable from a neutral position to at least first and second control positions, the control device having a first actuator portion for selectively actuating at least one of the control valves when moved to the first control position which includes a first non-locked control position and a first locked control position;

a detent arrangement operatively associated with the at least one of the control valves and operative with the first actuator portion for holding the control device in the first locked control position; and a detent assist assembly operative with the control device, the detent assist assembly assisting the detent arrangement in holding the control device in the first locked control position and including a first member having an outer surface including variable resistance portions that define the first non-locked and the first locked control positions, a second member being movable from a neutral position to a first and second operating position along said variable resistance portions, said second member having a second actuator portion for selectively actuating the other one of the control valves when the control device is moved to the second control position with the second member not engaging the variable resistance portions of the first member.

2. The control arrangement according to claim 1, wherein movement of said control device to the first non-locked and locked control positions engages the second member with the variable resistance portions and movement of said control device to the second control position disengages the second member from the variable resistance portions, the second member being operative with the variable resistance portions when in the second operating position to assist in holding the control device in the first locked control position.

3. The control arrangement according to claim 2, wherein the detent arrangement includes a magnet that engages the control device and the second member automatically moves from the second operating position to the neutral position when the magnet disengages from the control device.

4. The control arrangement according to claim 2, wherein the second member remains in contact with the outer surface of the first member during movement from the first operating position to the second operating position.

5. The control arrangement according to claim 4, wherein the second member contacts the outer surface of the first member at an upper portion when in the second operating position and movement between the resistance portion and upper portion defines a path having a predetermined shape, the shape being such that it restricts the movement of the second member once the second member moves to the second operating position.

6. The control arrangement according to claim 2, including a housing for mounting the second member and a spring disposed within the housing for biasing the second member toward the first member.

7. The control arrangement according to claim 6, wherein the housing includes a contact portion for actuating the other one of the control valves.

8. The control arrangement according to claim 6, wherein the control device has a pivot, the control device being pivotable about the pivot for movement between the first and second control positions and a plurality of additional control positions with means for connecting the second member with the housing to allow movement of the control device from the first control position to any one of the additional control positions without moving the second member from the second operating position.

9. The control arrangement according to claim 8, wherein the second member includes an opening and the connecting means includes a retaining member that extends through the housing and into the opening, the opening having a predetermined shape that allows movement of the second member within the housing relative to the movement of the control device to any one of the additional control positions.

10. The control arrangement according to claim 6, wherein the second member exerts a force on the spring when the second member engages the resistance portion.

11. The control arrangement according to claim 10, wherein the resistance portion includes an outermost tip and the force on the spring increases as the second member moves along the resistance portion with the greatest force exerted on the spring occurring when the second member contacts the outermost tip.

* * * * *